United States Patent
Ichiyama

(10) Patent No.: US 6,246,136 B1
(45) Date of Patent: Jun. 12, 2001

(54) MOTOR AND METHOD FOR MANUFACTURING THE SAME

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/334,273

(22) Filed: Jun. 16, 1999

(30) Foreign Application Priority Data

Jun. 18, 1998 (JP) .................................................. 10-171654

(51) Int. Cl.⁷ ....................................................... H02K 5/16
(52) U.S. Cl. ............................................. 310/90; 384/107
(58) Field of Search ............................... 310/90; 384/100, 384/107, 112, 113, 123

(56) References Cited

U.S. PATENT DOCUMENTS

| | | |
|---|---|---|
| 4,795,275 | 1/1989 | Titcomb et al. ...................... 384/107 |
| 5,067,528 | 11/1991 | Titcomb et al. ........................... 141/4 |
| 5,161,900 * | 11/1992 | Bougathou et al. .................. 384/133 |
| 5,524,728 | 6/1996 | Williams et al. ....................... 184/29 |
| 5,533,811 * | 7/1996 | Polch et al. ........................... 384/107 |
| 5,575,355 * | 11/1996 | Williams et al. ..................... 184/55.1 |
| 5,580,175 * | 12/1996 | Polch et al. ........................... 384/113 |
| 5,601,125 | 2/1997 | Parsoneault et al. ................... 141/51 |
| 5,634,724 * | 6/1997 | Zang et al. ........................... 384/107 |
| 5,658,080 * | 8/1997 | Ichiyama ............................... 384/112 |
| 5,707,154 * | 1/1998 | Ichiyama ............................... 384/107 |
| 5,791,785 * | 8/1998 | Nose et al. ............................ 384/119 |
| 5,806,987 * | 9/1998 | Nose et al. ............................ 384/100 |
| 5,839,833 * | 11/1998 | Zang ..................................... 384/107 |
| 5,847,479 * | 12/1998 | Wang et al. ............................ 310/90 |
| 5,876,124 * | 3/1999 | Zang et al. ........................... 384/107 |
| 5,941,644 * | 8/1999 | Takahashi ............................. 384/112 |
| 6,066,903 | 5/2000 | Ichiyama ................................. 310/90 |

FOREIGN PATENT DOCUMENTS

| | | |
|---|---|---|
| 8-4777 | 1/1996 | (JP) . |
| 9-303400 | 11/1997 | (JP) . |

* cited by examiner

*Primary Examiner*—Joseph Waks
(74) *Attorney, Agent, or Firm*—Shinjyu Intellectual Property Firm

(57) ABSTRACT

A motor includes a stationary shaft, a stationary thrust plate fixed to the stationary shaft and a rotor adapted to rotate about the stationary shaft and stationary thrust plate. A rotary thrust plate is fixed within an upper opening of the rotor facing an upper surface of the stationary thrust plate. Portions of a surface of each of the stationary and rotary thrust plates and lubricant therebetween define an upper thrust bearing. The rotary thrust plate is formed with a lubricant injection hole that allows for simple manufacturing steps wherein the motor is completely assembled before lubricant is injected through the lubricant injection hole into the upper thrust bearing and a lower thrust bearing defined between portions of adjacent surfaces of the stationary thrust plate and the rotor.

15 Claims, 11 Drawing Sheets

MOTOR AND METHOD FOR MANUFACTURING THE SAME

BACKGROUND OF THE INVENTION

1. Field of the Invention

This invention generally relates to a motor. More specifically, the present invention relates to a motor such as a spindle motor having hydrodynamic beatings, the spindle motor adapted to be provided in a disk-driving device for rotationally driving a data storage media such as a hard disk. The present invention also relates to a method for manufacturing the motor.

2. Background Information

FIG. 1 is a cross sectional view of a spindle motor (an electric motor), provided with hydrodynamic bearings that make use of the dynamic pressure of a lubricating fluid, for driving at least one data storage medium such as hard disk. The spindle motor depicted in FIG. 1 is described in detail in co-pending application Ser. No. 09/267,621, filed Mar. 15, 1999, now U.S. Pat. No. 6,066,903. The content of and disclosure in U.S. Pat. No. 6,066,903 is hereby incorporated by reference in its entirety.

The spindle motor depicted in FIG. 1 includes a stationary shaft 12 fixed to a base 10 and a rotor 11 rotatably supported by the stationary shaft 12 via hydrodynamic bearings. A lower end of the stationary shaft 12 is fixedly fitted in a coupling bore of a base 10 (base portion).

The stationary shaft 12 includes two main components: a stationary shaft portion 12a which extends rigidly upward from the base 10; and a stationary thrust plate 12b which is an annular plate member fixedly and coaxially fitted to an upper portion of the stationary shaft portion 12a.

The rotor 11 includes a rotary sleeve 18 that fits over the outer periphery of the stationary shaft 12 with a gap defined between opposing surfaces of the stationary shaft 12 and of the rotary sleeve 18. The rotary sleeve 18 includes a cylindrical rotor hub 18a and an annular rotary thrust plate 18b fixedly fitted into a portion of the rotary sleeve 18.

A hard disk (not shown) of a hard disk drive is carried on an outer peripheral portion of a cylindrical surface of the cylindrical rotor hub 18a.

The rotary thrust plate 18b is fixedly fitted in a large inner diameter portion 18a4 to partially define a thrust bearing gap 20 around the stationary thrust plate 12b. The thrust bearing gap 20 is defined between the opposing surfaces of the stationary and rotary thrust plates 12b and 18b and between the surfaces of the stationary thrust plate 12b and the side and bottom surfaces of a recess formed within a middle inner diameter portion 18a3 of the rotary sleeve 18. Above the rotary thrust plate 18b in the large inner diameter portion 18a4, an annular plate-shaped seal member 22 is fixedly fitted in place.

The radially inner portion of the surface which partially defines the upper portion of the thrust gap 20, specifically, the radially inner portion of the bottom or lower inclined surface 100 of the rotary thrust plate 18b, is tapered such that the lower inclined surface 100 of the rotary thrust plate 18b is inclined upward toward the center of the stationary shaft 12. As a result, an air space 29 defined between the lower inclined surface 100 of the rotary thrust plate 18b and the upper flat surface of the stationary thrust plate 12b progressively increases toward the center of the stationary shaft 12 to form a tapered seal of an upper thrust bearing 40.

A radially inner portion of the surface of the rotary sleeve 18 is formed with a tapered surface 20a that is inclined downward toward the radially inner direction thereby defining a tapered seal of a lower thrust bearing 42.

Lubricant 44 is provided as needed in the gap between the stationary shaft 12 and the rotary sleeve 18, in particular in the regions depicted in FIG. 1. The lubricant 44 is retained at each respective position by the above described tapered seals, and in particular as a result of the surface tension created on the surface of the lubricant 44.

The effects of surface tension in the lubricant 44 cause formation of a meniscus in each exposed portion of the lubricant 44, for example between the lower inclined surface 100 and the adjacent surface of the stationary thrust plate 12b. The meniscus, in effect, defines an interface between the lubricant 44 and air. There are upper and lower interfaces defined by the meniscus of the lubricant 44 in the annular gaps between the walls defining the thrust bearing gap 20 and the surfaces of the stationary thrust plate 12b. The upper and lower interfaces face radially inward at the air space 29 and first oil separating space 32. An annular oil-free space 46 is defined at an inner periphery from the lower interface (lower meniscus) of the lubricant 44 at the first oil separating space 32.

On an inner peripheral surface of the stationary thrust plate 12b, an axial groove is formed. When the stationary thrust plate 12b is fixedly fitted on the stationary shaft portion 12a, the axial groove defines a breathing bore 48 between the outer peripheral surface of the stationary shaft portion 12a and the inner peripheral surface of the stationary thrust plate 12b. The breathing bore 48 connects the annular oil free space 46 to the air outside of the spindle motor via the annular space 31, a gap between the outer peripheral surface of the stationary shaft portion 12a and the inner peripheral surfaces of the rotary thrust plate 18b, the lubricant catching groove 30, and a gap between the outer peripheral surface of the stationary shaft portion 12a and the seal member 22. The breathing bore 48 has a cross sectional size that is large enough so as not to be closed by the lubricant 44 due to surface tension. The breathing bore 48 can be formed at a plurality of positions of the stationary thrust plate 12b.

An upper radial bearing 56 and a lower radial bearing 58 are formed by herringbone groove portions 54 and 55, respectively, of the inner peripheral surface of the journal portion 18a1 and the portions of the outer peripheral surface of the stationary shaft member 12a that face the herringbone grooves 54 and 55. The upper radial bearing 56 is located immediately beneath the first oil separating space 32. The lower radial bearing 58 is located between the air space 28 and a second oil separating space 62.

An air communication or conduit bore 64 is formed inside the stationary shaft portion 12a. The bore 64 includes a lower opening 64a which is open to the lubricant 44 in the lower radial bearing 58, and the bore 64 includes an upper opening 64b which is open to the second oil separating space 62. The lower opening 64a is disposed in the proximity of a boundary between the lower radial bearing 58 and the air space 28. The upper opening 64b is disposed in the proximity of a boundary between the upper portion and the lower portion of the second oil separating space 62.

The spindle motor described above is typically assembled by first inserting a lower portion of the stationary shaft portion 12a into the rotary sleeve 18 such that, for instance, only the portion of the shaft portion 12a below the upper opening 64b is inserted into the rotary sleeve 18. Lubricant, such as the lubricant 44, is applied to the portion of the shaft portion 12a proximate the upper opening 64b. Thereafter, the shaft portion 12a is lowered into the rotary sleeve 18 thereby drawing and spreading the lubricant down into the portions of the rotary sleeve 18 which subsequently form the radial hydrodynamic bearings 56 and 58 and the lower thrust bearing 42. Lubricant 44 is also applied to the upper surface of the thrust plate 12b after completely inserting the thrust plate 12b and shaft 12 into the rotary sleeve 18. Next, the rotary thrust plate 18b is fitted to the opening of the rotary sleeve 18 above the thrust plate 12b. The rotary thrust plate 18b and the rotary sleeve 18 are adhered to one another by, for instance, adhesive or glue.

However, in the above described spindle motor, the contacting surfaces 18s1 and 18s2 of the rotary sleeve 18 and the rotary thrust plate 18b are adhered to one another with adhesive after the lubricant has been applied to surfaces of the shaft 12 and thrust plate 12b. The lubricant, which is a lubricating oil, sometimes tends to migrate between the contacting surfaces 18s1 and 18s2 due to a capillary action. As a result, the adjacent surfaces 18s1 and 18s2 can become contaminated with the lubricant resulting in the lack of adhesion of the adhesive between the surfaces 18s1 and 18s2. In such circumstances, the rotary sleeve 18 and the rotary thrust plate 18b may not be satisfactorily adhered to one another leading to leakage of lubricant.

In view of the above, there exists a need for a motor and a method of manufacturing a motor which overcome the above mentioned problems in the prior art. Especially, the present invention provides a motor in which the rotary thrust plate and the rotary sleeve are more reliably adhered to one another easily and tightly, thereby preventing reduction in productivity. The present invention also provides a method of manufacturing such motor. This invention addresses this need in the prior art as well as other needs, which will become apparent to those skilled in the art from the following disclosure.

SUMMARY OF THE INVENTION

It is a general object of the present invention to provide a hydrodynamic bearing device.

Another object of the present invention is to provide a reliable method of assembling a spindle motor.

Another object of the present invention is to provide a simple method for constructing a spindle motor with secure sealing adhesion between a cover member and rotor member of the spindle motor.

Another object of the present invention is to provide a method of assembling a spindle motor without a decrease in productivity due to problems concerning the adhesion between members of the spindle motor.

It is a related object of the present invention to provide a hydrodynamic bearing device which can support a rotational member for precise rotation.

It is another related object of the present invention to provide a hydrodynamic bearing device which can support a rotational member with high oil sealing performance for precise rotation.

It is further related object of the present invention to provide a hydrodynamic bearing device having long operation life.

It is another object of the present invention to provide a spindle motor having a hydrodynamic bearing device that is reliable in operation and life.

It is a further object of the present invention to provide a reliable and long-life spindle motor for use in a hard disk drive.

In accordance with one aspect of the present invention, a spindle motor includes a stationary shaft having a shaft portion and a disk-shaped stationary thrust plate fixed thereto. The shaft portion extends from a base to the distal end thereof, and the stationary thrust plate is fixed proximate the distal end of the shaft portion. The shaft portion is further formed with at least one radial bearing surface. A rotor having at least one journal portion is formed with a recess which defines a first thrust surface. The journal portion has an inner radial surface that faces the radial bearing surface of the shaft portion, and the first thrust surface axially faces a lower surface of the thrust plate. Portions of the first thrust surface and the lower surface of the thrust plate define a lower thrust bearing and the journal portion and the radial bearing surface define at least one radial bearing. A rotary thrust plate is adhered to the rotor within an opening of the rotor axially-aligned with the stationary shaft. A lower surface of the rotary thrust plate defines a second thrust surface that axially faces an upper surface of the stationary thrust plate. Portions of the second thrust surface and the upper surface of the thrust plate define an upper thrust bearing. The recess in the rotor and an outer circumferentially extending surface of the stationary thrust plate define a lubricant filled gap open to both the upper and lower thrust bearings. The rotary thrust plate is formed with a lubricant injection bore that extends from the lubricant filled gap to an upper surface of the rotary thrust plate.

With the above configuration, it is possible to assemble the spindle motor and then inject lubricant into the lubricant filled gap and upper and lower thrust bearings without contaminating the adhesive between the rotary thrust plate and the rotor. In this way, retention of the lubricant within the motor is assured and a reliable adhesion and seal between the rotary thrust plate and the rotor is ensured.

In accordance with another aspect of the present invention, there is a method of manufacturing a motor that includes the steps of providing a shaft with a first thrust plate fixed thereto;

providing a second thrust plate with a lubricant injection bore;

inserting the shaft and the first thrust plate into an open portion of a sleeve member;

inserting and adhering the second thrust, plate into the sleeve member within the open portion of the sleeve member; and injecting the lubricant through the lubricant injection bore thereby providing lubricant to gaps between surfaces of the sleeve member, the first thrust plate and the second thrust plate, the gaps and surfaces defining thrust bearings of the motor.

With the above method, it is possible to assemble the spindle motor and then inject lubricant into the lubricant filled gap and upper and lower thrust bearings without affecting the adhesion between the rotary thrust plate and the rotor. In this way, retention of the lubricant within the motor is assured and a reliable adhesion and seal between the rotary thrust plate and the rotor is ensured.

These and other objects, features, aspects and advantages of the present invention will become apparent to those skilled in the art from the following detailed description, which, taken in conjunction with the accompanying drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
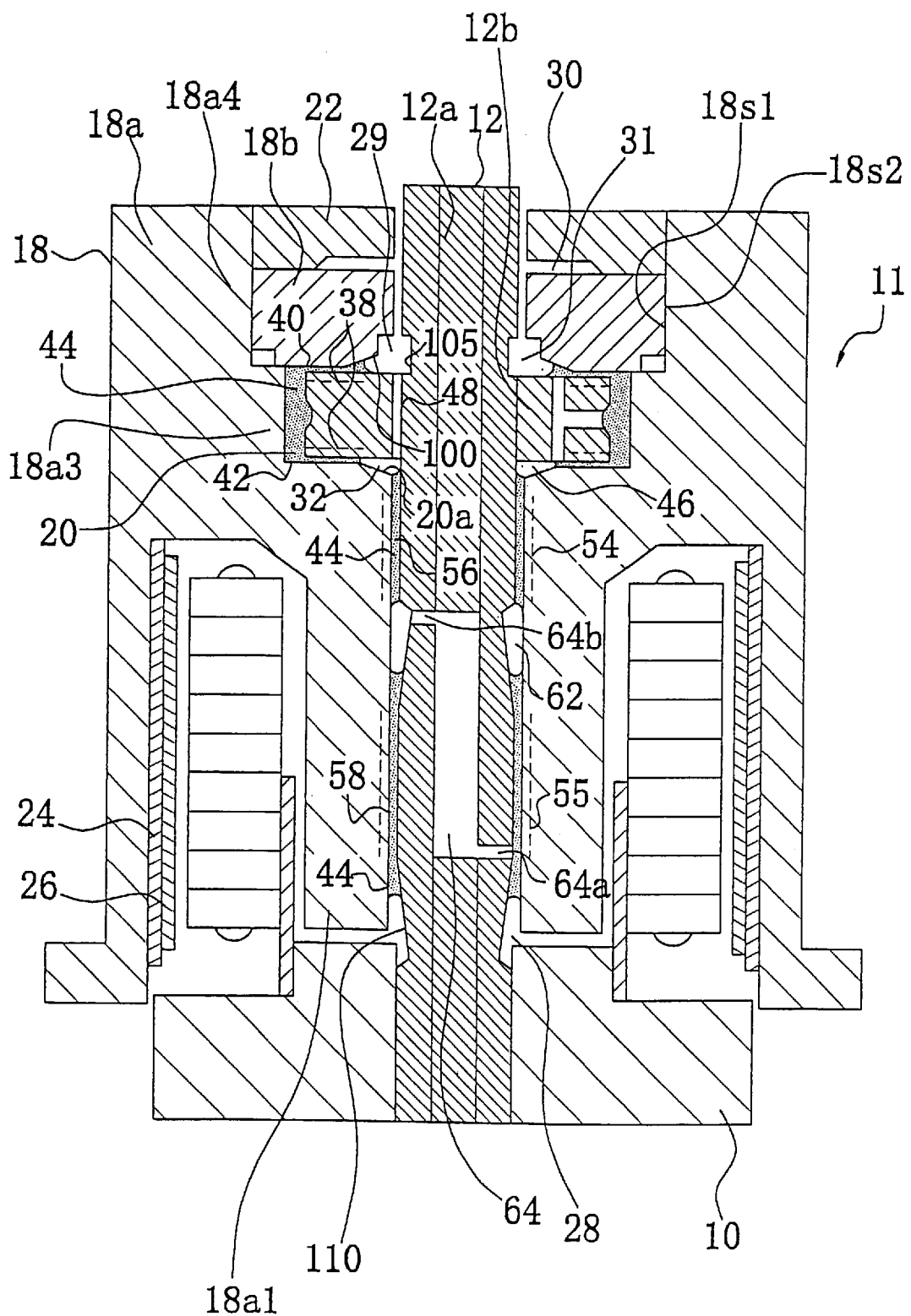
FIG. 1 is a cross sectional side view of a spindle motor used in devices such as computer hard disk drives.
Figure 2:
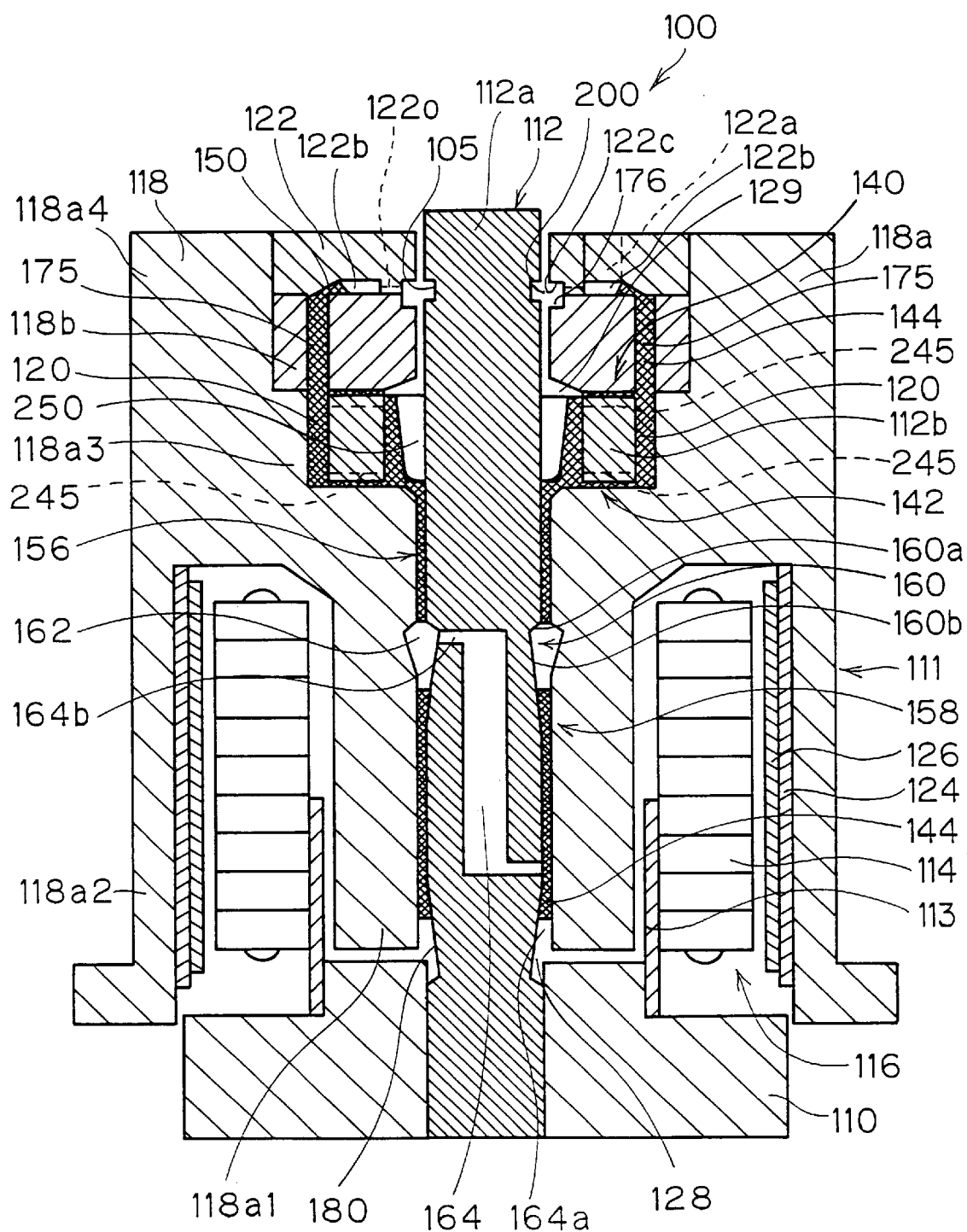
FIG. 2 is a cross sectional side view of a spindle motor according to a first embodiment of the present invention, for use in devices such as a computer hard disk drives.

A first embodiment of the present invention is depicted in FIG. 2, which is a cross sectional view of a spindle motor 100 for rotating, for instance, the hard disk of a hard disk drive. The spindle motor 100 of the present invention includes a new configuration of a hydrodynamic bearing and rotor structure and a method for manufacturing the spindle motor, as described in greater detail below.

The spindle motor of the present invention includes a stationary shaft 112 fixed to a base 110 and a rotor 111 rotatably supported by the stationary shaft 112 via a hydrodynamic bearing whose components and configuration are described in greater detail below.

A lower end of the stationary shaft 112 is fixedly fitted in a coupling bore of a base 110 (base portion). A cylindrical support member 113 is fixed on an outer periphery of the upper cylindrical portion of the base 110 and extends upward (with respect to FIG. 2) from the base 110. A stator core 116, about which a stator coil 114 is wound, is carried on an outer peripheral surface of the cylindrical support member 113.

The stationary shaft 112 includes two main components: a stationary shaft portion 112a which extends rigidly upward from the base 110; and a stationary thrust plate 112b which is an annular plate member fixedly and coaxially fitted to an upper portion of the stationary shaft portion 112a. The stationary shaft portion 112a and the stationary thrust plate 112b can be manufactured as two separate members later assembled together or may be manufactured as a single solid member made continuously from a single material. In the present embodiment, as shown in FIG. 2, the stationary shaft portion 112a and stationary thrust plate 112b are two separate members assembled together to constitute the stationary shaft 112. The stationary thrust plate 112b is formed with herringbone grooves 245 on upper and lower surfaces thereof. Further, the stationary thrust plate 112b is formed with several vent holes 250 which extend between the upper and lower surfaces thereof. The purpose and function of the herringbone grooves 245 and the vent holes 250 is provided in greater detail below.

The rotor 111 includes a rotary sleeve 118, a cylindrical rotor yoke 124, and a rotor magnet 126. The rotary sleeve 118 fits over the outer periphery of the stationary shaft 112 with a gap defined between opposing surfaces of the stationary shaft 112 and of the rotary sleeve 118. The rotary sleeve 118 includes a cylindrical rotor hub 118a and an annular rotary thrust plate 118b fixedly fitted into a portion of the cylindrical rotor hub 118a, as is described below.

A hard disk (not shown) of a hard disk drive is carried on an outer peripheral portion of a cylindrical surface of the rotary sleeve 118. The lower half of the cylindrical rotor hub 118a is formed with two concentric cylindric extensions, each having a tubular shape. The inner of the two concentric cylindric extensions is a journal portion 118a1. The outer of the two concentric cylindric extensions is a supporting portion 118a2 that supports rotor magnets 126. The journal portion 118a1 loosely fits over the outer periphery of the stationary shaft portion 112a between the stationary thrust plate 112b and the base 110 defining a gap therebetween. A middle inner diameter portion 118a3 having an inner diameter larger than an inner diameter of the journal portion 118a1 is formed on the rotor hub 118a above the journal portion 118a1. A large inner diameter portion 118a4 having an inner diameter larger than the inner diameter of the middle diameter portion 118a3 is formed on the rotary sleeve 118 above the middle diameter portion 118a3.

The rotary thrust plate 118b is fixedly fitted in the large inner diameter portion 118a4 to partially define a thrust bearing gap 120 around the stationary thrust plate 112b. The thrust bearing gap 120 is defined between the opposing surfaces of the stationary and rotary thrust plates 112b and 118b and between the surfaces of the stationary thrust plate 112b and the side and bottom surfaces of the recess formed within the middle inner diameter portion 118a3. Above the rotary thrust plate 118b in the large inner diameter portion 118a4, an annular plate-shaped top cover 122 is fixedly fitted in place.

The rotary thrust plate 118b is formed with at least one and preferably two first lubricant injection bores 175 that extend from an upper axial end surface of the plate 118b to a lower axial end surface of the plate 118b. The first lubricant injection bores 175 serve as lubricant reservoirs in a manner described in greater detail below. An upper inner surface of the rotary thrust plate 118b is formed with a recess 176, also described in greater detail below.

The stationary shaft 112 is shown fixed to the base 110 at the lower end thereof but will also be fixed to a member such as a cover (not shown) of a hard disk device at an upper end portion thereof. This way, stable rotation of the rotary sleeve body 118 can be assured since the stationary shaft 112 is supported at both of its ends.

On an inner periphery of a rotor magnet supporting portion 118a2 of the cylindrical rotor hub 118a, the cylindrical rotor yoke 124 made of ferromagnetic material is fixedly coupled. A rotor magnet 126 is fixedly fitted to an inner periphery of the cylindrical rotor yoke 124 around the stator core 116. However, an annular gap is maintained between the rotor magnet 126 and the stator core 116.

The lower radially inner portion of the rotary thrust plate 118b is inclined upward toward the center of the stationary shaft 112 defining a lower inclined surface 150. As a result, an air space 129 defined between the lower inclined surface 150 of the rotary thrust plate 118b and the upper flat surface of the stationary thrust plate 112b such that the air space 129 progressively increases toward the center of the stationary shaft 112 to form a tapered seal.

An oil repellent treatment is made above the lower inclined surface 150 with an oil repellent agent being coated on the inner radial surface of the rotary thrust plate 118b and on the portion of the outer radial surface of the stationary shaft portion 112a that adjacently faces the inner peripheral surface of the rotary thrust plate 118b. Immediately above the oil repellent agent, an annular groove 105 is formed, adjacent to the recess 176.

The top cover 122 is formed with a second lubricant injection bore 122a that extends from an upper axial end surface of the top cover 122 to a lower axial end surface thereof. An annular concave recess 122b is formed at a radially inward portion of a lower surface of the top cover 122. The recess 122b is partially formed by a tapering surface of the top cover 122 such that the recess 122b decreases in axial width toward a radially outward end thereof. An annular recess 122c is formed on a radially inner portion of the top cover 122 adjacent to the annular groove 105 on the shaft 112a and the recess 176 on the thrust cover 118b. The annular recess 122c, the annular groove 105 and the recess 176 together define an annular lubricant catching groove 200. As can be seen in FIG. 2, the recess 122b is connected to the annular lubricant catching groove 200 via a radially extending opening 122o.

An oil repellant treatment is made with an oil repellent agent being coated on the inner peripheral surface of the top cover 122 and on the portion of the outer peripheral surface of the stationary shaft portion 112a that adjacently faces the inner peripheral surface of the top cover 122 with a small gap of, for instance, about 50 µm.

An upper thrust bearing 140 is formed by a portion of the upper surface of the stationary thrust plate 112b, a portion of the lower surface of the rotary thrust plate 118b and the herringbone grooves 245 on the upper surface of the stationary thrust plate 112b. A lower thrust bearing 142 is formed by a portion of the lower surface of the stationary thrust plate 112b, the herringbone grooves 245 formed on the lower surface of the stationary thrust plate 112b and a portion of the bottom surface of the middle inner diameter portion 118a3 of the rotary sleeve 118.

Lubricant 144 is provided as needed in the gap between the stationary shaft 112 and the rotary sleeve 118, in particular in the regions depicted in FIG. 2. The lubricant 144 is retained the gap 120 by tapered seal at the inclined surface 150, described above, and in particular as a result of the surface tension created on the surface of the lubricant 144 at the inclined surface 150.

It should be appreciated that the tapered surface 150 promotes the effects of surface tension on the lubricant, thus defining the interfaces (meniscus), which assist in retaining the lubricant 144 in place.

The lubricant 144 may be any of various lubricants, such as spindle oil, can be used. The effects of surface tension in the lubricant 144 cause formation of a meniscus in each exposed portion of the lubricant 144, for example between the lower inclined surface 150 and the adjacent surface of the stationary thrust plate 112b. The meniscus, in effect, defines an interface between the lubricant and air. There are upper and lower interfaces defined by the meniscus on the surface of the lubricant 144: the upper interface being located in the annular gap between the radially inward portion of stationary thrust plate 112b and the inclined surface 150; and the lower interface being located below an upper radial bearing 156 in a recess 160, described in greater detail below. Further, another meniscus is formed by the inclined surface of the recess 122b thereby retaining lubricant 144 in the first lubricant injection bores 175 (which also serve as a lubricant reservoir).

In response to rotation of the spindle motor 100, when the rotor sleeve 118 rotates about the stationary shaft 112, lubricant may possibly move from area of the upper thrust bearing 140 upward toward the annular lubricant catching groove 200. Lubricant 144 trapped within the annular lubricant catching groove 200 is urged radially outward due to centrifugal forces, into radially extending opening 122o, into the recess 122b and into the first lubricant injection bores 175, which, as mentioned above, serve as a lubricant reservoir.

A recess 180 on a lower outer peripheral portion of the stationary shaft portion 112a that faces a lower end portion of the cylindrical rotor hub 118a is tapered in a manner such that the diameter of the shaft progressively decreases in a downward direction. As a result, an air space 128 between the recess 180 of the stationary shaft portion 112a and the inner peripheral surface of the journal portion 118a1 forms a tapered seal which progressively increases in a downward direction in order to take advantage of the surface tension of the lubricant 144 to create a meniscus. Oil repellent treatment is applied to the lower end portion of the inner peripheral surface of the journal portion 118a1 proximate the recess 180 with an oil repellent agent being coated thereon.

The upper radial bearing 156 (mentioned briefly above) and a lower radial bearing 158 are formed by portions of the inner peripheral surface of the journal portion 118a1 having herringbone grooves formed thereon and portions of the outer peripheral surface of the stationary shaft member 112a adjacent thereto. The upper radial bearing 156 is located immediately beneath the rotary thrust plate 118b and the lower radial bearing 158 is located between the air space 128 and a second oil separating space 162 that is described in greater detail below.

Gaps between the inner peripheral surface of the journal portion 118a1 and the outer peripheral surface of the stationary shaft portion 112a are usually a few or several micrometers wide at the upper and lower radial bearings 156 and 158.

The annular recess 160 (mentioned briefly above) opens radially outward and is formed on the outer peripheral surface of the stationary shaft portion 112a between the upper and lower radial bearings 156 and 158. The recess 160 is formed by upper inclined surface 160a and lower inclined surface 160b. The upper surface 160a of the annular recess 160 is axially short and largely or steeply tapered such that the outer diameter of the shaft decreases largely in a relatively short axial, downward direction. Whereas the lower surface 160b of the annular recess 160 is comparatively axially long and moderately tapered such that the outer radius decreases relatively gradually in an upward direction over a greater axial length.

The second oil separating space 162 is formed between the annual recess 160 and the radially inner surface of the journal portion 118a1. An upper portion of the second oil separating space 162 defines a base side tapered seal for keeping the lubricant 144 in the upper radial bearing 156, and a lower portion of the second oil separating space 162 provides an upper side tapered seal for keeping the lubricant 144 in the lower radial bearing 158. Specifically, the surface 160a provides a means for enhancing the surface tension on the lubricant 144 at a lower end of the upper radial bearing 156 and the surface 160b provides a means for enhancing the surface tension on the lubricant 144 at an upper portion of the lower radial bearing 158.

As described above, the upper surface 160a has a relatively short axial length, whereas the lower surface 160b has a relatively long axial length. In this embodiment, a lower end side interface of the lubricant 144 in the upper radial bearing 156 is disposed at the upper portion of the second oil separating space 162, whereas an upper end side interface of the lubricant 144 in the lower radial bearing 158 is disposed at the lower portion of the same.

An air communication or conduit bore 164 is formed inside the stationary shaft portion 112a. The bore 164 includes a lower opening 164a which is open to the lubricant 144 in the lower radial bearing 158, and the bore 164 includes an upper opening 164b which is open to the second oil separating space 162. The lower opening 164a is disposed in the proximity of a boundary between the lower radial bearing 158 and the air space 128. The upper opening 164b is disposed in the proximity of a boundary between the upper portion and the lower portion of the second oil separating space 162.

The bore 164 may be formed by first forming a bore that passes vertically through the axial center of the stationary shaft portion 112a, forming openings 164a and 164b by forming radial bores from the outer peripheral surface of the stationary shaft portion 112a, and thereafter plugging or filling the pass-through bore below and above the openings 164a and 164b respectively. Each of the openings 164a and 164b can be plural, if desired or deemed necessary.

When the rotary sleeve 118 is not in motion, the lower opening 164a is covered with the lubricant 144 to prevent vaporization of the lubricant 144 facing the second oil separating space 162 and therefore shortage of lubricant due to vaporization. On the other hand, while the rotary sleeve 118 rotates, as described above, the herringbone grooves urge the lubricant upward and the lower end interface of the lubricant 144 at the lower radial bearing 158 is drawn upward just above the air space 128 or further as a result of the upward movement of the lubricant 144, the lower opening 164a of the bore 164 becomes open to the lower portions of the spindle motor and also become open to outside the spindle motor via the air space 128 and the space around the stator 116 and lower portions of the rotor 118.

Herringbone grooves at the upper radial bearing 156 are formed such that dynamic pressure to move the lubricant 144 upward is generated within a range of production tolerance, during rotation of the rotary sleeve 118.

Further description of the radial and thrust bearings and the herringbone grooves formed therein is provided in co-pending application Ser. No. 09/271,621, filed Mar. 15, 1999. The content and disclosure in co-pending application Ser. No. 09/271,621, filed Mar. 15, 1999 is hereby incorporated by reference in its entirety.

Figure 3A:
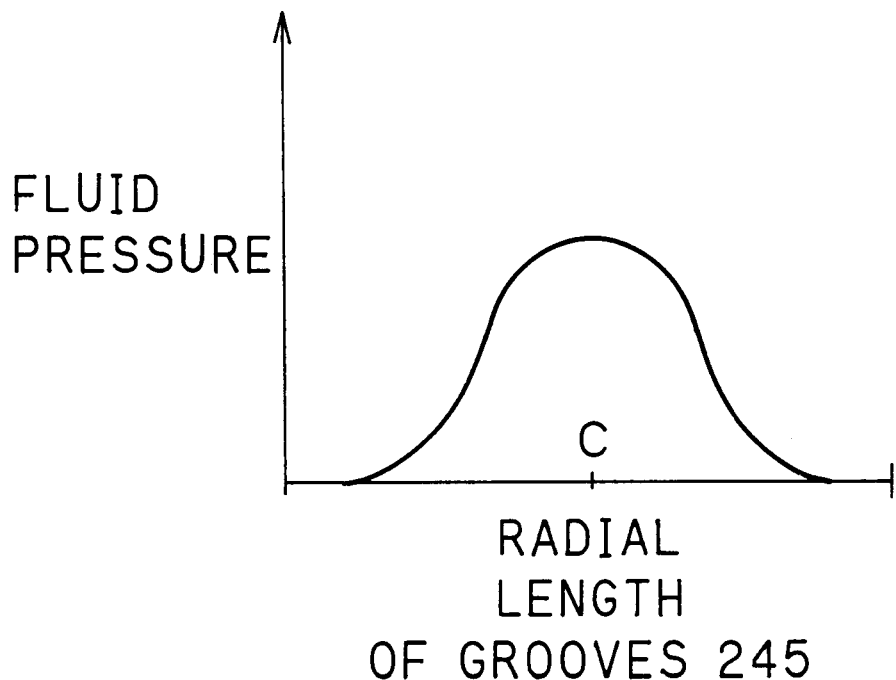
FIG. 3A is a graph showing hydrodynamic pressure distribution in upper and lower thrust bearings of the spindle motor depicted in FIG. 2.
Figure 3B:
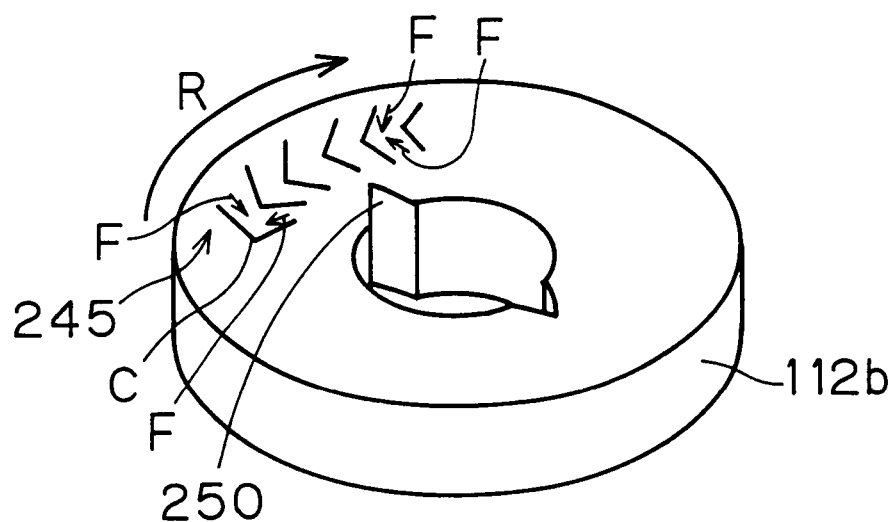
FIG. 3B is a perspective view of an upper surface of a stationary thrust plate shown removed from the shaft of the spindle motor depicted in FIG. 2, showing a portion of herringbone grooves formed on the upper surface which, in response to rotation of the spindle motor, generate the hydrodynamic pressure depicted in FIG. 3A.

As described above, portions of the upper and lower surfaces of the stationary thrust plate 112b that partially form the upper and lower thrust bearings 140 and 142 are each formed with substantially the same with herringbone grooves 245. The stationary thrust plate 112b is shown separated from the stationary shaft 112 in FIG. 3B with some of the numerous herringbone grooves 245 depicted. Each herringbone groove 245 is formed in a V-shape with each leg of the V-shape having approximately the same length. Upon rotation of the rotor 118 around the stationary shaft 112, lubricant 144 in and adjacent to the herringbone grooves 245 is urged toward the center point C of each herringbone groove 245 as indicated by the arrows F in FIG. 3B. As shown in FIG. 3A, during rotation of the spindle motor 100 a generally symmetrical pressure distribution is created along a radial length of each herringbone groove 245 such that at the center point C the hydrodynamic fluid pressure is largest and toward inner and outer radial ends of each herringbone groove 245 hydrodynamic fluid pressure is lowest. Typically, centrifugal forces urge lubricant 144 radially outward in the gap 122, however, the hydrodynamic fluid pressure generating effects of the herringbone grooves 245 insure a high fluid pressure at the point C of each herringbone groove, thereby drawing fluid radially inward away from radially outward areas of the gap 122.

Vapor bubbles which may occasionally form in the lubricant 144 during rotation of the spindle motor 100 naturally move toward lower pressure areas, and therefore, vapor bubbles that form in the lubricant 144 move away from the point C toward radially inward and outward edges of the herringbone grooves 245. Vapor bubbles that move toward the radially inward edge of the herringbone grooves 245 are able to escape through the vent hole 250 and thereby exit the rotor 118 through the gap between the stationary shaft 112 and the inner surfaces of the rotary thrust plate 118b and top cover 122. Vapor bubbles that move radially outward are able to escape through the first lubricant injection bores 175, into the recess 122b, through the opening 122o and exit the spindle motor 100 through the gap between the top cover 122 and the stationary shaft 112.

It should be understood that venting of vapor through the at least one first lubricant injection bore 175 is a necessary feature of the present invention. For instance, if there were no path or vent proximate a radial outward portion of the gap 120 through which vapor could escape, continued increases in size of a vapor bubble at a radially outward portion of the gap 120 would eventually expose the herringbone grooves 245 causing an imbalance in hydrodynamic fluid pressure distribution. As a result, the stiffness of the thrust bearings 140 and 142 would be lessened, thereby allowing undesirable axial movement of the rotor 118. The first lubricant injection bores 175 provide a reliable path through which vapor may exit the inner portions of the spindle motor 100 thereby ensuring a desired stiffness of the thrust bearings 140 and 142.

Figure 5:
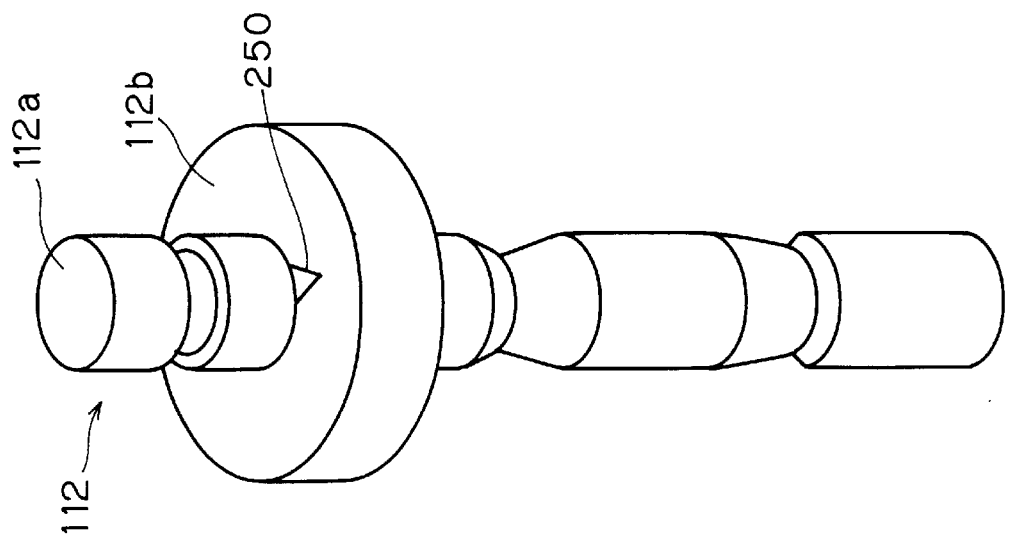
FIG. 5 is a perspective view of the stationary shaft depicted in FIG. 3 with a thrust plate installed thereon.
Figure 4:
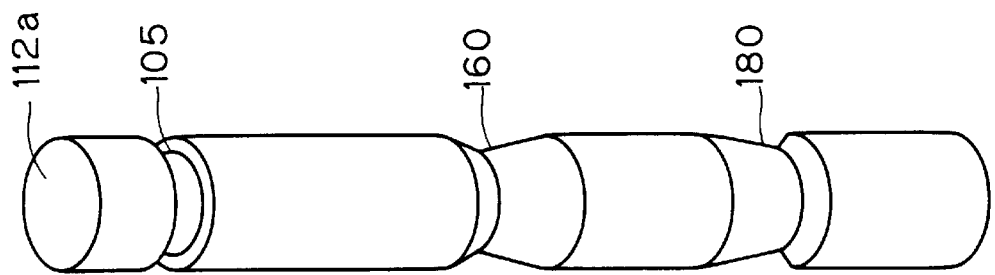
FIG. 4 is a perspective view of a stationary shaft of the spindle motor depicted in FIG. 2.
Figure 6:
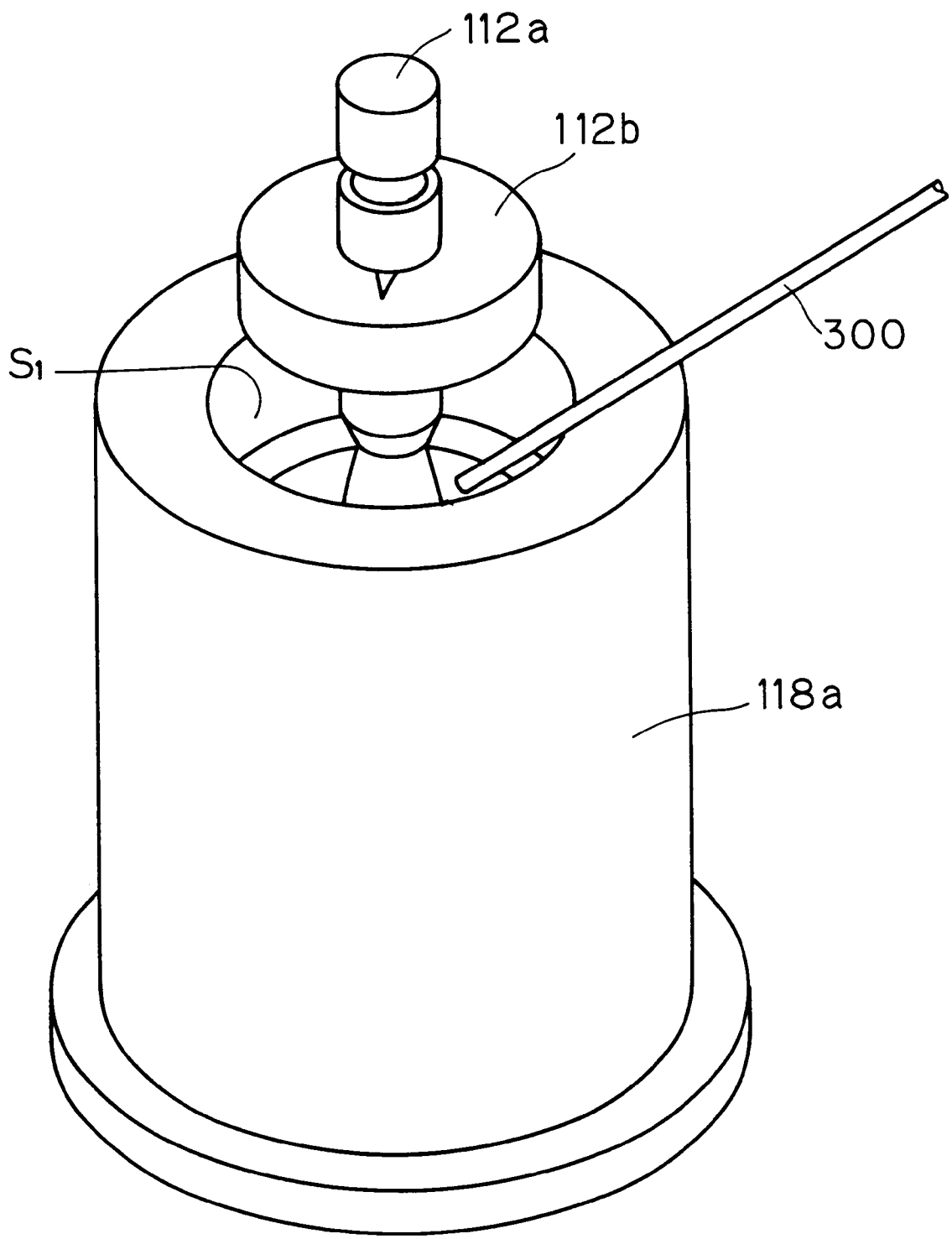
FIG. 6 is a perspective view of the stationary shaft depicted in FIGS. 4 and 5 partially installed in a rotor so that lubricant can be applied to a portion of the stationary shaft of the spindle motor.

A method of manufacture of the spindle motor 100 is provided below and shown in FIGS. 4 through 10. First, as shown in FIG. 4, the stationary shaft 112a is formed with various surface enhancements such as the recesses 105 and 160, and the surface 180. Next, as shown in FIG. 5, the thrust plate 112b is installed on the shaft 112a thereby forming the complete shaft assembly 112. It should be appreciated that the herringbone grooves are not shown in FIGS. 5, 6 and 7 to provide greater clarity. As shown in FIG. 6, the shaft 112a and thrust plate 112b are partially inserted into the rotor hub 118a. It should be understood that the rotor hub 118a includes, although not shown in FIG. 6, the rotor magnet 126 fixedly fitted to the cylindrical rotor yoke 124, as described previously above.

Figure 7:
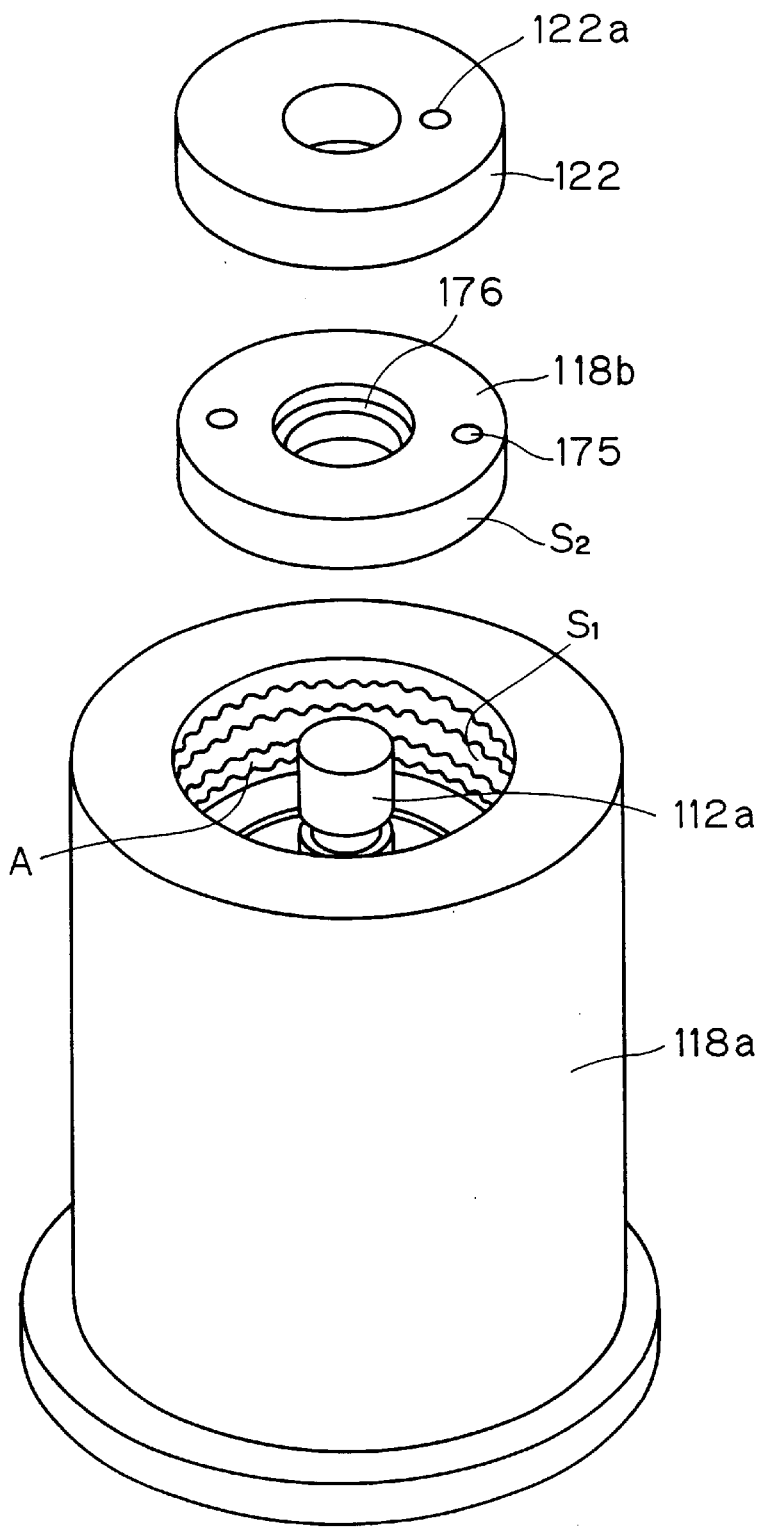
FIG. 7 is a perspective view of the stationary shaft installed in the rotor depicted in FIG. 6, with a rotary thrust plate and top cover being installed thereon.

At this point, lubricant 144 is applied to the lower regions of the shaft 112a proximate the recess 160 via an injecting tool, such as the tube 300 shown in FIG. 6. After injection of lubricant 144 into the rotor hub 118a, the shaft 112a and stationary thrust plate 112b are completely lowered into the rotor hub 118a, as shown in FIG. 7. As the shaft 112a is inserted into the rotor hub 118a, movement of the shaft 112a drags and spreads the lubricant 144 between the surfaces of the shaft 112a and the inner surfaces of the rotor hub 118a filling the regions which subsequently forms the upper and lower radial bearings 156 and 158.

As shown in FIG. 7, the rotor hub 118a includes an opening encircled by a surface Si. Since lubricant was applied only between the lower portions of the shaft 112a and inner surfaces of the rotor hub 118a, thus far lubricant is prevented from contacting the surface $S_1$. The lubricant 144 at this point is primarily located between the recess 160 and the surface 180, contacts adjacent inner surfaces of the rotor hub 118a thereby forming the lower radial bearing 158, and may also be located in the area of the upper radial bearing 156.

After the shaft 112a and the thrust plate 112b are loosely installed in the rotor hub 118a, the surface $S_1$ is coated with an adhesive A, such as a glue or other suitable adhesive material, as is shown in FIG. 7. Thereafter, the rotary thrust plate 118b is inserted into the opening at the surface $S_1$ such that the adhesive A contacts a surface $S_2$ of the rotary thrust plate 118b thereby providing an adhesive seal between the surface $S_1$ of the rotor hub 118a and the surface $S_2$ of the rotary thrust plate 118b. The adhesive A further serves to hold the rotary thrust plate 118b in position within the rotor hub 118, as shown in FIG. 2. Thereafter, adhesive is applied to the upper surface of the rotary thrust plate 118b and may also be re-applied, if necessary, to the surface $S_1$. The top cover 122 is fitted into the opening of the rotor hub 118a and is held in position by the adhesive A on the surface $S_1$ of the rotor hub 118a and the adhesive on the upper surface of the rotary thrust plate 118b. Therefore, the top cover 122 and the rotary thrust plate 118b are adhered together.

Figure 9:
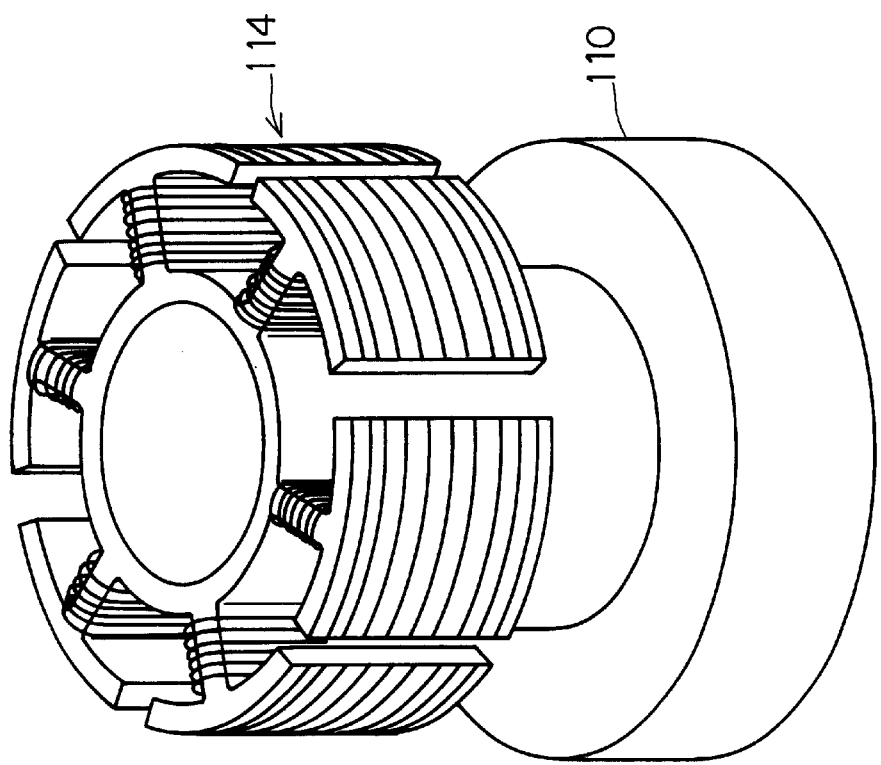
FIG. 9 is a perspective view of the base depicted in FIG. 8 With a stator core fixed thereto.
Figure 8:
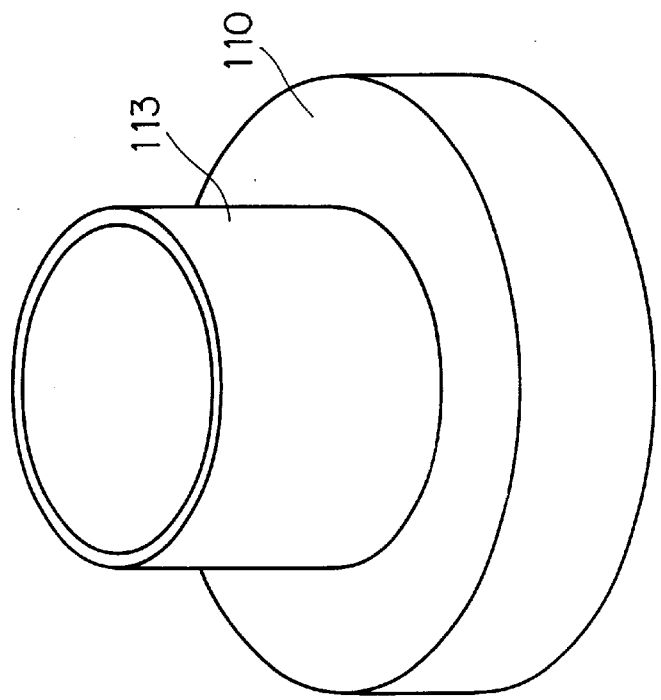
FIG. 8 is a perspective view of a base of the spindle motor depicted in FIG. 2.
Figure 10:
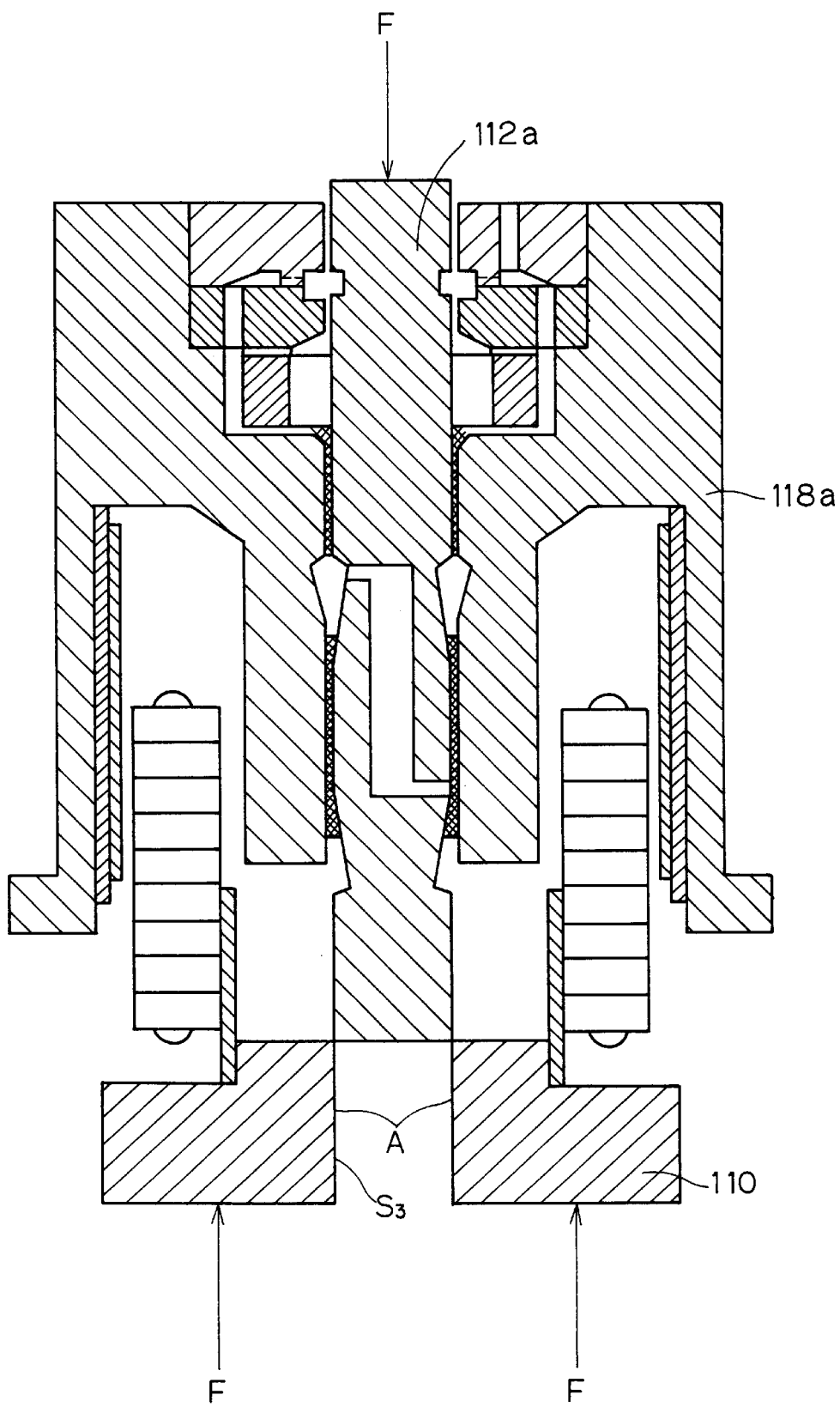
FIG. 10 is a cross sectional side view of the shaft, rotor and top cover depicted in FIG. 7 during installation on the base depicted in FIGS. 8 and 9.
Figure 11:
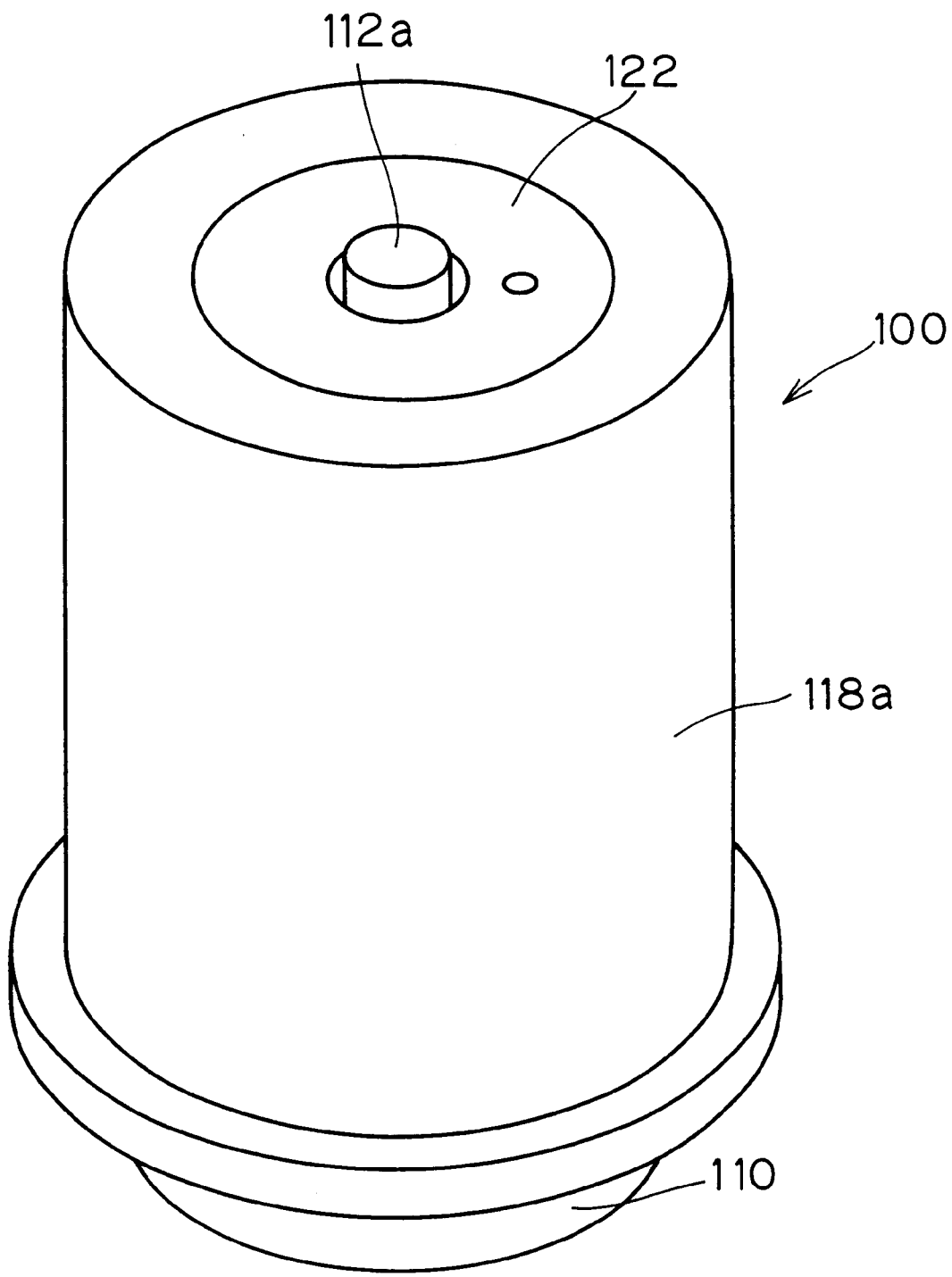
FIG. 11 is a perspective view of the shaft, rotor and top cover depicted in FIG. 7 after installation on the base depicted in FIGS. 8 and 9.

As was described above, the base 110 has the cylindrical support member 113 fixed thereto, as shown in FIG. 8. The stator coil 114 is fixed to the cylindrical support member 113 as shown in FIG. 9. An adhesive A is applied to a surface $S_3$ of the base 110 that encircles an opening in the base 110. Thereafter, the lower end of the shaft 112a extending out of the bottom of the rotor hub 118a is inserted into the center of the stator coil 114, with the rotor hub 118a surrounding but spaced apart from the stator coil 114, until the lower end of the shaft 112a engages the surface $S_3$ on the base 110, as shown in FIG. 10. A small pressing forces F applied in an upward direction on the base 110 and a downward direction on the shaft 112a to push the shaft 112a into the opening at the surface $S_3$, as shown in FIG. 10, until the shaft 112a is installed on the base 110 as shown in FIGS. 2 and 11. The small forces F being applied to the shaft 112a and the base 110 place no force on the rotor hub 118a thereby preventing any stress or external forces from acting on and possibly damaging the thrust plate 112b and rotary thrust plate 118b.

The spindle motor 100 is shown in FIG. 11 in an assembled state. At this point, lubricant 144 is installed through the second lubricant injection bore 122a. Lubricant 144 injected into the second lubricant injection bore 122a moves downward into the recess 122b, through the first lubricant injection bores 175 and into the gap 122. After injection of lubricant 144 in the second lubricant injection bore 122a, the bore 122a is plugged with any of a variety of sealing means. For instance, a metal or plastic plug, or a sealant material may be inserted into the second lubricant injection bore 122a.

The spindle motor 100 is now aged by any of a variety of processes. For example, in a first aging process, the spindle motor 100 is rotated at a reduced speed, compared to the normal operational speed of the spindle motor 100. Rotation of the rotor hub 118a around the stationary shaft 112a causes the lubricant 144 to be properly distributed and causes vapor bubbles that might be trapped in the lubricant to move out of high pressure areas of the thrust bearings and radial bearings and vent out of the spindle motor 100. By rotating the spindle motor 100 at a reduced speed, possible damage to the motor is avoided and lubricant is evenly distributed within the hydrodynamic bearings in the motor.

In a second, alternative aging process, the spindle motor 100 may be placed in a pressure vessel (not shown) in which air pressure may be controlled. At first, the air pressure in the pressure vessel is gradually lowered to, for instance, 90% of standard temperature and pressure (STP) for a predetermined period of time to force vapor in the lubricant 144 to expand slowly and be purged out of the spindle motor 100. The pressure in the pressure vessel is then gradually returned to normal pressure (STP) for a predetermined period of time. Thereafter, the pressure is gradually lowered again in the pressure vessel to a level of, for instance 80% of STP, thereby gently purging more vapor out of the lubricant. After a predetermined period of time, the pressure in the pressure vessel is returned to STP. The process may be repeated several times at a variety of pressure settings until the lubricant in the motor is substantially free of vapor. Simultaneous with the above described pressure reducing operations, the spindle motor 100 is rotated at a reduced speed, as described above in the first aging process, to further ensure elimination of vapor and evenly distribute the lubricant 144 in the hydrodynamic thrust and radial bearings 140, 142, 156 and 158.

After the aging process, the spindle motor 100 is subjected to a heat-curing process to harden the adhesive A applied to the surfaces $S_1$ and $S_3$.

Since the lubricant 144 is injected into the spindle motor 100 after the top cover 122 and the rotary thrust plate 118b are fixed to the inner peripheral surface $S_1$ of the rotor hub 118a, the lubricant 144 does not contaminate inner peripheral surface $S_1$ and therefore does not compromise the sealing properties of the adhesive A between the inner peripheral surface $S_1$ of the rotor hub 118a and the rotary thrust plate 118b, and between the inner peripheral surface $S_1$ of the rotor hub 118a and the top cover 122. In this way, the rotary thrust plate 118b and the top cover 122 are firmly adhered to the inner peripheral surface $S_1$ of the rotor hub 118a in an easy manner. Further, the above described method of manufacture of the spindle motor is accomplished in a short period of time that does not negatively affect productivity in the manufacture of such motors. Since the lubricant 144 is not injected into the thrust hydrodynamic bearings 140 and 142 until the top cover 122 and the rotary thrust plate 118b are secured in position withing the rotor hub 118a, problems such as lack of adherence between members, leakage or the like are avoided. In this way, an easy assembly method of the spindle motor 100 becomes possible.

Since the first lubricant injection bores 175 serve as a lubricant reservoir, the lubricant 144 is supplied therefrom as needed when the lubricant 144 in the thrust hydrodynamic bearings 140 and 142 decreases, thereby lengthening the useful operational life of the thrust hydrodynamic bearings 140 and 142.

Since the axial height of the recess 122b tapers in a radially outward portion thereof approaching the first lubricant injection bores 175 due to the inclination of the surface of the recess 122b, vapor bubbles in the lubricant 144 are purged easily, and further, the lubricant 144 is retained therein by centrifugal forces and surface tension. As well, the location of the annular lubricant catching groove 200 is such that lubricant leakage out of the spindle motor 100 is prevented since lubricant is captured by the surfaces surrounding the annular lubricant catching groove 200. Upon rotation of the spindle motor 100, any lubricant captured within the annular lubricant catching groove 200 is urged into the opening 122o, then into the recess 122b and finally into the first lubricant injection bores 175.

Since the first lubricant injection bores 175 of the rotary thrust plate 118b are open to a radially outward portion of the gap 120 and hydrodynamic thrust bearings 140 and 142, the lubricant 144 is supplied as needed to the hydrodynamic thrust bearings 140 and 142 for the following reasons. The inclined surface of the recess 122b and the centrifugal forces during rotation urge the lubricant 144 to remain in the first lubricant injection bores 175. However, as described above, the herringbone grooves 245 on the surfaces of the stationary thrust plate 112b create a low pressure area at the radially outward portion of the stationary thrust plate 112b (see FIG. 3A). Therefore, lubricant 144 in the first lubricant injection bores 175 easily moves from the first lubricant injection bores 175 to the low pressure area of the gap 122 and low pressure areas of the thrust bearings 140 and 142.

In the above described embodiment, both the top cover 122 and the rotary thrust plate 118a were used together as a sealing means for the upper end of the spindle motor 100.

Figure 12:
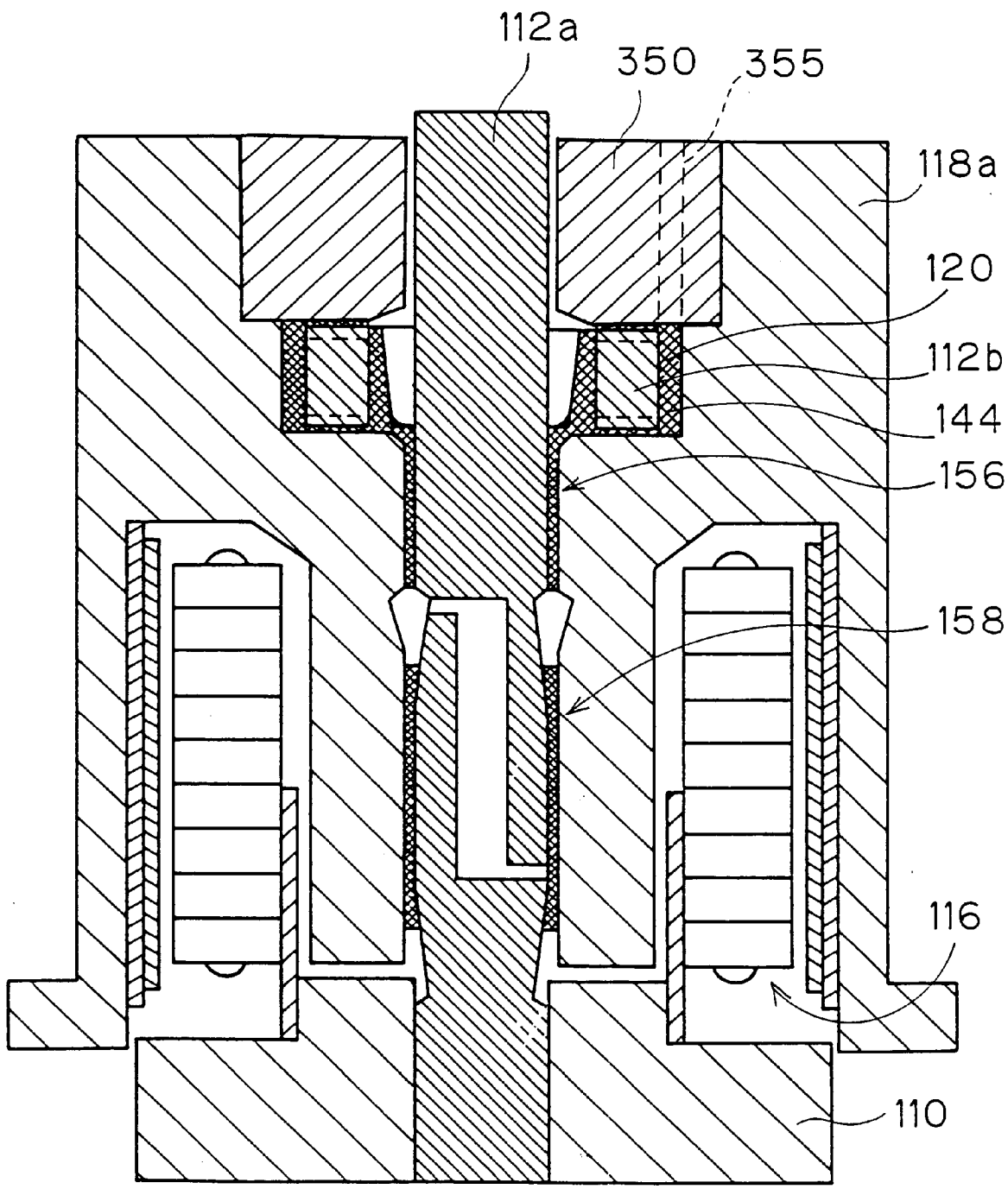
FIG. 12 is a cross sectional side view of a spindle motor in accordance with a second embodiment of the present invention.

Alternatively, in a second embodiment depicted in FIG. 12, a spindle motor may be sealed at the upper end thereof with a single top cover/rotary thrust plate 350. The spindle motor depicted in FIG. 12 is identical to that depicted in FIG. 2 accept that the top cover 122 and the rotary thrust plate 118a have been eliminated and replaced by the single top cover/rotary thrust plate 350. The spindle motor depicted in FIG. 12 has the same stationary shaft 112a, stationary thrust plate 112b and rotor hub 118 as the first embodiment described above. Further, the spindle motor depicted in FIG. 12 is manufactured in the same way as the spindle motor depicted in FIGS. 2–11, accept that the top cover 122 and the rotary thrust plate 118a depicted in FIG. 7 are not installed but rather, in their place, the single top cover/rotary thrust plate 350 is installed in the rotor hub 118a.

The single top cover/rotary thrust plate 350 is formed with an injection bore 355 that is used to inject lubricant 144 into the spindle motor 100. However, the injection bore 355 is not plugged or sealed after injection of lubricant 144 because the injection bore 355 serves as a vent for vapor which may be purged from the lubricant 144 during the above described aging processes and/or during normal usage of the spindle motor depicted in FIG. 12. The injection bore 355 extends completely through the single top cover/rotary thrust plate 350 to the radially outward portion of the gap 122 and radially outward portions of both the upper and lower thrust bearings 140 and 142.

Figure 13:
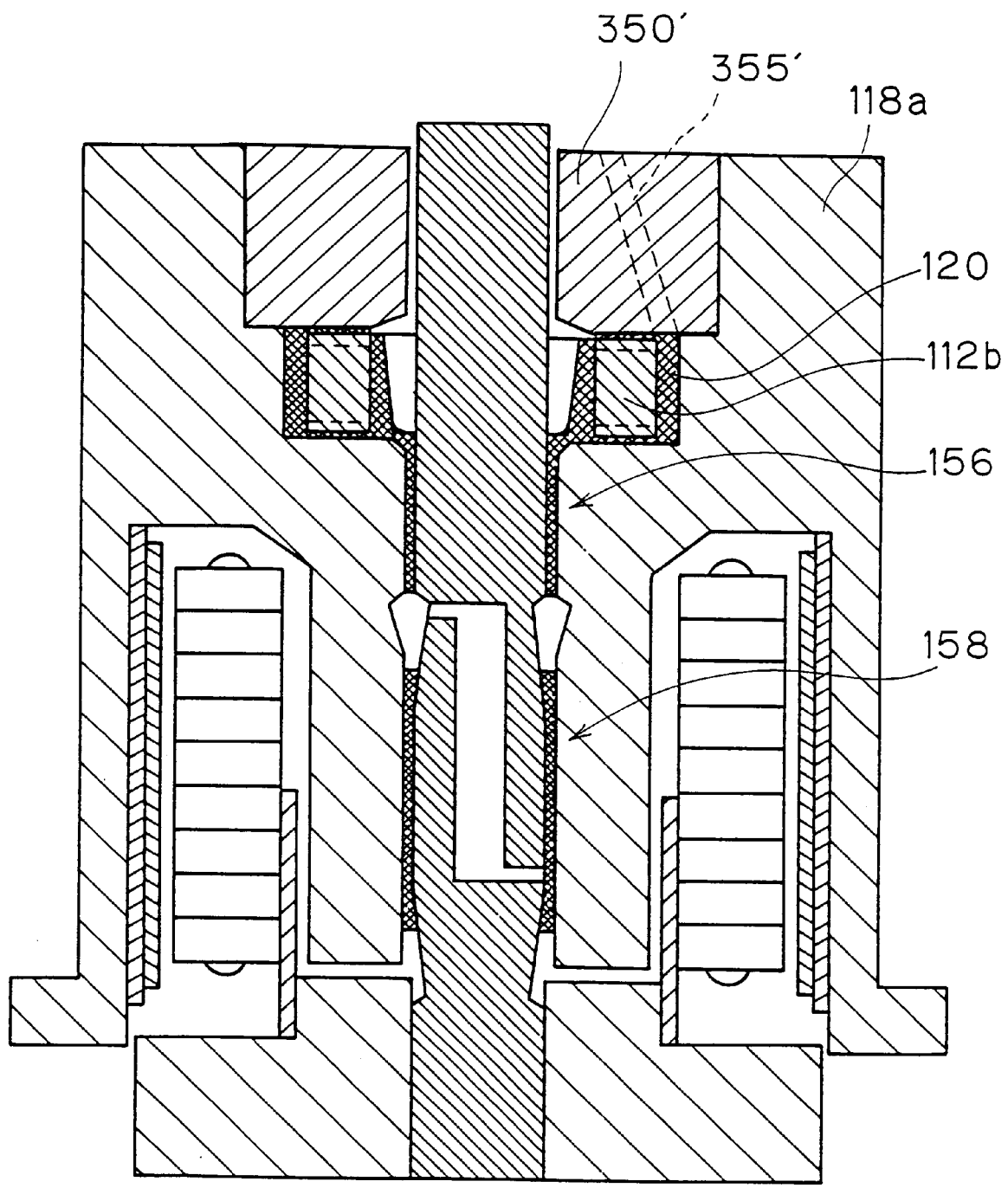
FIG. 13 is a cross sectional side view of a spindle motor in accordance with a third embodiment of the present invention.

As is shown in FIG. 12, injection bore 355 is formed such that upper end and lower end thereof are generally parallel to the stationary shaft 112a. However, as shown in a third embodiment depicted in FIG. 13, an injection bore 355' in a top cover/rotary thrust plate 350' may be formed such that the upper end (the end open to outside the spindle motor) is disposed radially inward relative to lower end thereof (end open to the gap 122 and hydrodynamic thrust bearings 140 and 142) to prevent the lubricant 144 from moving upward due to the centrifugal force during rotation of the spindle motor.

It should be understood that the top cover/rotary thrust plates 350 and 350' serve as a rotary thrust plate in a manner generally the same as the rotary thrust plate 118b described above with respect to the first embodiment depicted in FIG. 2.

While only three embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A motor comprising:
   a shaft;
   a substantially disk-shaped thrust plate fitted to a portion of said shaft extending radially outward therefrom;
   a substantially cylindrical sleeve member having a central opening extending therethrough adapted to receive said shaft and a portion of said thrust plate such that a first small gap is formed between portions of said shaft and said sleeve member, said first small gap being continuous with a second small gap formed between said thrust plate and said sleeve member;
   a second thrust plate adapted to be rigidly coupled to a surface defining said central opening of said sleeve member with one end of said shaft extending through a central opening of said second thrust plate, said second thrust plate being formed with at least one first lubricant injection bore; and
   wherein
      a lubricant is disposed in said first and second gaps,
      adjacent surfaces of said shaft and said sleeve member, said first gap and said lubricant therein, and, adjacent surfaces of said thrust plate and said sleeve member, said second gap and said lubricant therein, define a plurality of hydrodynamic bearings, said hydrodynamic bearings adapted to provide support between said shaft and said sleeve member for relative rotary displacement therebetween, and
      said first lubricant injection bore is open to a radially outward portion of one of said hydrodynamic bearings proximate a radially outward portion of said thrust plate, and to an upper surface of said second thrust plate, so as to communicate said first gap and said second gap with outside air.

2. The motor as set forth in claim 1, wherein:
   said sleeve member is a rotor and said shaft is a stationary shaft, said rotor being adapted for rotation about said shaft; and
   said second thrust plate comprises:
      a rotary thrust plate fixed to said rotor, and
      a cover fixed to said rotary thrust plate and said rotor, said cover being formed with an annular lubricant reservoir open to said first lubricant injection bore, said cover being formed with a second lubricant injection bore that is in fluid communication with said annular lubricant reservoir.

3. The motor as set forth in claim 2, wherein said lubricant reservoir is partially defined by a tapering surface on said cover such that an axial height of said lubricant reservoir decreases in a radially outward direction.

4. The motor as set forth in claim 2, wherein said shaft is formed with a groove adjacent to said cover and said cover is formed with an adjacent recess, said recess and said groove defining an annular lubricant catching groove adapted to capture lubricant and direct the captured lubricant into said annular lubricant reservoir.

5. The motor as set forth in claim 1, wherein:
said sleeve member is a rotor and said shaft is a stationary shaft, said rotor being adapted for rotation about said shaft;
said second thrust plate comprises a single solid plate member; and
said first lubricant injection bore is formed at an inclination with respect to said shaft such that said first lubricant injection bore is open to said radially outward portion of said one of said hydrodynamic bearings proximate a radially outward portion of said thrust plate and said first lubricant injection bore extends radially inward toward said shaft away from said radially outward portion of said one of said hydrodynamic bearings.

6. The motor as set forth in claim 1, wherein:
said shaft is a stationary shaft fixed to a base and said sleeve member is a rotor;
said adjacent surfaces of said shaft and said sleeve member, said first gap and said lubricant therein define upper and lower hydrodynamic radial bearings; and
said adjacent surfaces of said thrust plate and sleeve member, said second gap, said lubricant therein, and said second thrust plate define upper and lower hydrodynamic thrust bearings.

7. The motor as set forth in claim 6, wherein said thrust plate is formed with a vent hole open to radially inward portions of said upper and lower thrust bearings such that air bubbles in said lubricant are able to escape therethrough.

8. The motor as set forth in claim 6, wherein said upper and lower hydrodynamic radial bearings are separated by an air separation gap, said air separation gap being partially defined by a recess formed on an outer surface of said shaft.

9. An spindle motor comprising:
a stationary shaft having a shaft portion and a disk-shaped stationary thrust plate fixed thereto, said shaft portion extending from a base to a distal end thereof, and said stationary thrust plate formed proximate the distal end of said shaft portion, said shaft portion being further formed with at least one radial bearing surface;
a rotor having at least one journal portion, said rotor being formed with a recess which defines a first thrust surface, said journal portion having an inner radial surface facing said radial bearing surface of said shaft portion, and said first thrust surface axially facing a lower surface of said thrust plate, portions of said first thrust surface and said lower surface of said thrust plate defining a lower thrust bearing, said journal portion and said radial bearing surface defining at least one radial bearing;
a rotary thrust plate fixed within an opening of said rotor axially aligned with said stationary shaft, a lower surface of said rotary thrust plate defining a second thrust surface that axially faces an upper surface of said thrust plate, portions of said second thrust surface and said upper surface of said thrust plate defining an upper thrust bearing; and
wherein said recess in said rotor and an outer circumferentially extending surface of said stationary thrust plate further defines a lubricant filled gap open to both said upper and lower thrust bearings, and said rotary thrust plate is formed with a first lubricant injection bore that extends from a radially outward portion of said lubricant filled gap to an upper surface of said rotary thrust plate so as to form a vent for said lubricant filled gap.

10. The spindle motor as set forth in claim 9, wherein portions of said upper and lower surfaces are formed with hydrodynamic pressure generating grooves configured to generate hydrodynamic fluid pressure in said lubricant in response to rotation of said rotor about said stationary shaft such that high fluid pressure is generated a radially central portion of said hydrodynamic pressure generating grooves, and low fluid pressure is generated at both a radially inward portions and radially outward portions of said stationary thrust plate.

11. The spindle motor as set forth in claim 10, wherein said hydrodynamic pressure generating grooves are herringbone grooves.

12. The spindle motor as set forth in claim 11, wherein said rotary thrust plate comprises:
a rotary thrust plate fixed to said rotor; and
a cover fixed to said rotary thrust plate and said rotor, said cover being formed with an annular lubricant reservoir open to said first lubricant injection bore, and said cover being formed with a second lubricant injection bore that is in fluid communication with said annular lubricant reservoir.

13. The spindle motor as set forth in claim 12, wherein said lubricant reservoir is partially defined by a tapering surface on said cover such that an axial height of said lubricant reservoir decreases in a radially outward direction.

14. The spindle motor as set forth in claim 12, wherein said stationary shaft is formed with a groove adjacent to said cover and said cover is formed with an adjacent recess, said recess and said groove defining an annular lubricant catching groove adapted to capture lubricant and direct the captured lubricant into said annular lubricant reservoir.

15. The spindle motor as set forth in claim 11, wherein:
said rotary thrust plate comprises a single solid plate member having said first lubricant injection bore formed therein, said first lubricant injection bore being inclined with respect to said stationary shaft such that said first lubricant injection bore is open to said lubricant filled gap and said first lubricant injection bore extends radially inward toward said stationary shaft away from said lubricant filled gap.

* * * * *